United States Patent [19]

Kuchler

[11] Patent Number: 5,401,133
[45] Date of Patent: Mar. 28, 1995

[54] SECURITY WASHER FOR SECURITY PANELING SYSTEM

[75] Inventor: Richard Kuchler, Big Bend, Wis.

[73] Assignee: Wildeck, Inc., Waukesha, Wis.

[21] Appl. No.: 122,392

[22] Filed: Sep. 16, 1993

[51] Int. Cl.⁶ .......................... F16B 23/00; F16B 35/06
[52] U.S. Cl. .................................... 411/402; 411/910; 411/919
[58] Field of Search ............... 411/368, 402, 403, 405, 411/910, 919, 410

[56] References Cited

U.S. PATENT DOCUMENTS

| | | | |
|---|---|---|---|
| 1,447,564 | 3/1923 | Norlund et al. | 411/910 X |
| 2,708,844 | 5/1955 | Cincel | 411/910 X |
| 4,018,111 | 4/1977 | Goldhaber | 411/910 X |
| 4,093,285 | 6/1978 | Fayle | 411/402 X |
| 4,502,825 | 3/1985 | Yamada | 411/402 X |

FOREIGN PATENT DOCUMENTS

| | | | |
|---|---|---|---|
| 108814 | 10/1943 | Sweden | 411/402 |
| 1188163 | 4/1970 | United Kingdom | 411/402 |
| 1446437 | 8/1976 | United Kingdom | 411/402 |

OTHER PUBLICATIONS

Avdel Technical Data; AVSAFE; Slotless, Tamper Resistant Screws; Series FP/FR/FG.
SpecData; Item No. 3; Alcan Building Products; May 1990.
Design Sales Associates; 3/1.02 Section at Panel Joint; Item No. 1.
Environmental Interiors Inc.; Celline Security Acoustical Ceiling System; Working Drawings For Optional Concealed Fastening System; Item No. 5.
Environmental Interiors Inc.; Celline Security Acoustical Ceiling System; Working Drawings and Specifications; Item No. 4.

*Primary Examiner*—Neill R. Wilson
*Attorney, Agent, or Firm*—Michael, Best and Friedrich

[57] ABSTRACT

Panels of a security paneling system are secured to a support member with a plurality of security fastening assemblies consisting of a security fastener and a security washer. The security fastener includes a shank connected to a slotless head including a peripheral edge portion having a special shape. The security fastener is rotatable for installation and removal with a special driving tool including a driver head which has a cavity with an internal shape corresponding to the shape of the peripheral edge portion of the security fastener head and is adapted to fit over and drivingly engage the peripheral edge portion. The security washer includes a central aperture through which the shank of the security fastener extends and a recess concentric with the aperture for receiving the head of the security fastener. The recess has a bottom wall on which the head of the security fastener rests, a depth at least about as deep as the height of the peripheral edge portion of the security fastener, and a minimum inside dimension approximating but slightly greater than the maximum outside dimension of the tool driver head to permit the cavity of the tool to fit over the head and drivingly engage the peripheral edge portion, thereby minimizing access to the head of the security fastener with a tool other than the special driving tool.

8 Claims, 2 Drawing Sheets

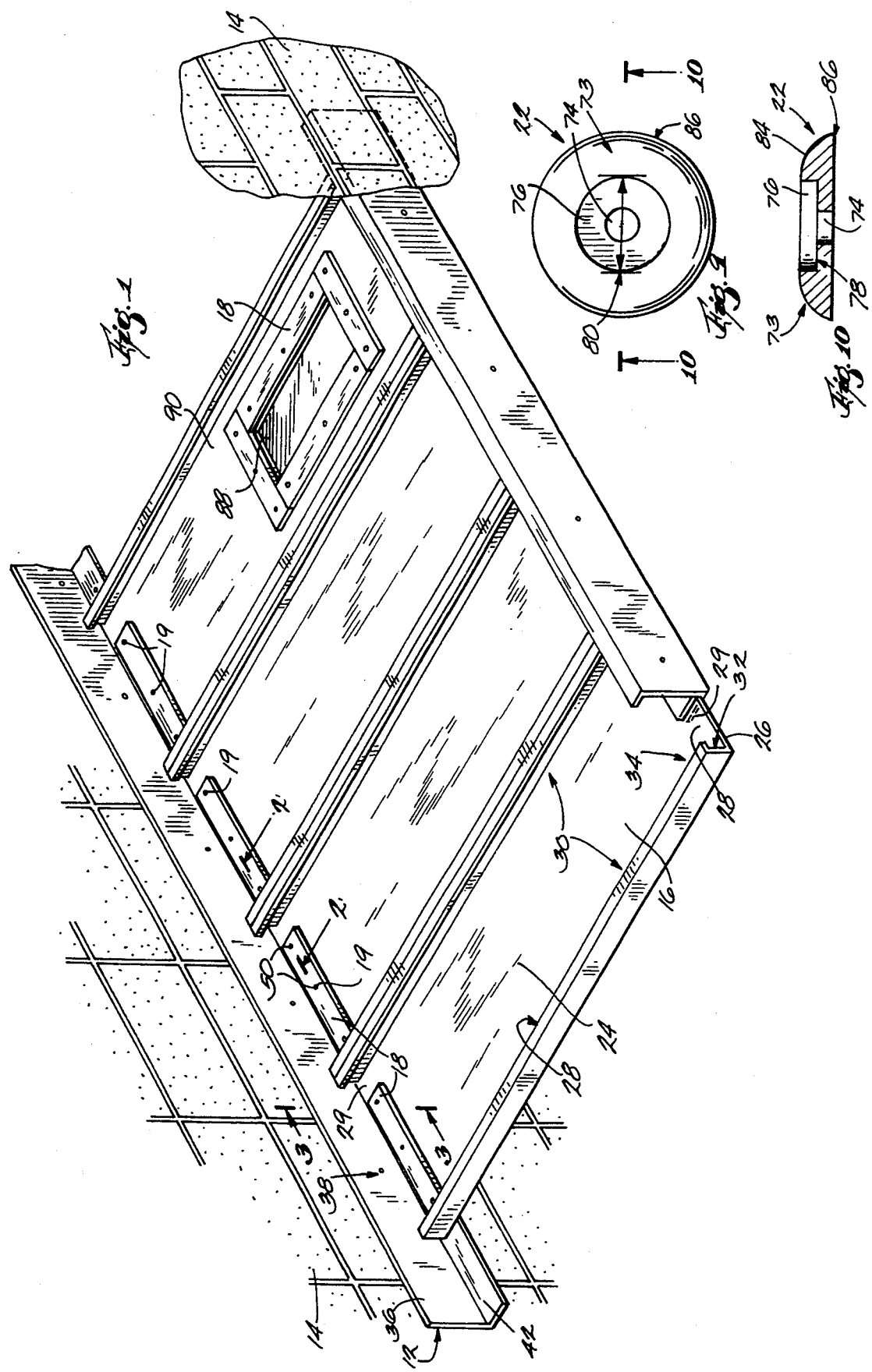

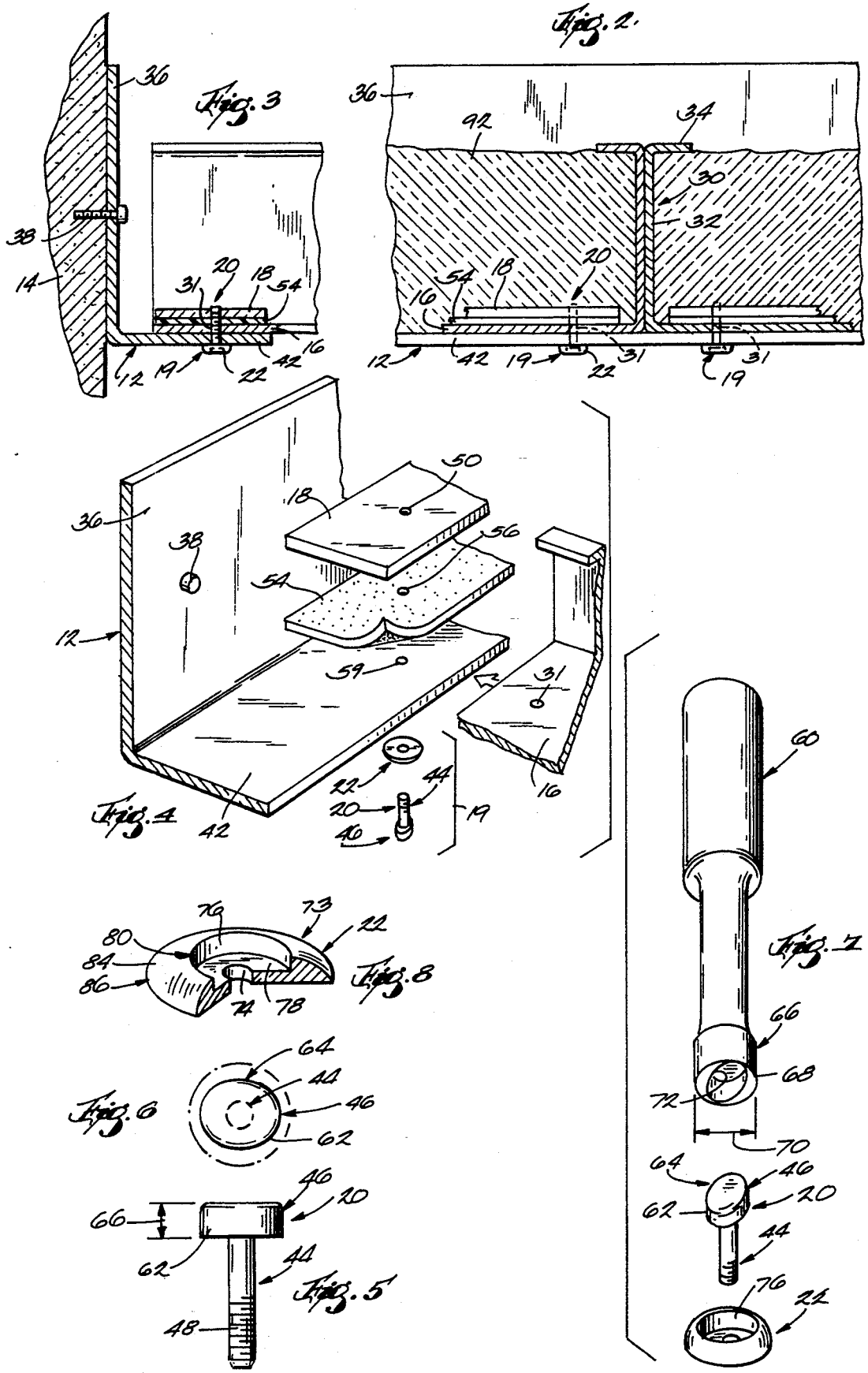

5,401,133

SECURITY WASHER FOR SECURITY PANELING SYSTEM

BACKGROUND OF THE INVENTION

1. Field of the Invention

The invention relates to paneling systems including a plurality of panels supported on wall mounted or overhead supports and, more particularly, to security paneling systems for forming ceilings in correctional institutions and other applications requiring tamper resistant paneling systems.

2. Reference to Prior Art

Security paneling systems for forming ceilings in correctional institutions typically include a plurality of rectangular metal panels including a planar web section, which is either solid or perforated, and side rails having a side wall extending away from the interior of the room or cell. The side walls typically extend from and along the length of the opposite edges of the web section, and abut the side walls of other panels. The opposed ends of the panels are mounted on supporting flanges or the ends of other panels. Primarily for security purposes, it is desirable for the ceiling support arrangement to be designed so that the ceiling panels cannot be removed by a person in the interior of the room except with a special tool, and so that the ends and side walls of the ceiling panels cannot be pushed or pried away from the supporting flanges far enough to secret contraband, such as razor blades, drugs and the like.

The ends of the panels resting on the support flanges are typically secured to the flanges by clamps, as exemplified by in U.S. Handley et al. U.S. Pat. No. 4,858,409 and assignee's copending U.S. application Ser. No. 844,249, filed Mar. 2, 1992, which is incorporated herein by reference.

The ends of the panels may also be secured to the support flanges by removable security fasteners, as disclosed in Alcan Building Products (Charlotte, N.C.) specification sheet number 09545 (May 1990) describing the Alcan Security Ceiling System and Environmental Interiors Inc. (Hudson, N.H.) specification sheets (Jun. 10, 1991) describing the Cell-line TM Security Acoustical Ceiling System. One type of security fastener is the slotless, tamper resistant Avsafe TM Series FP/FR/FG screw marketed by Avdel Corporation, Systems Division, Parsippany, N.J. (hereinafter "Avsafe TM screw") and described in Avdel technical data sheet FP/FR/FG-01290. Security fasteners such as the Avsafe TM screw typically include a shank connected to a slotless head having a slightly oblong, peripheral edge portion that is engageable for installation and removal with a special drive tool and cannot be engaged for rotation with an ordinary socket, hex head wrench or other conventional tools.

While such security fasteners are tamper resistant, they are susceptible to tampering by persons having, for example, a pair of conventional needle-nose pliers for gripping and rotating the head of the screw. They are also susceptible to tampering using a screwdriver for prying against and deforming the head of the screw, so that ordinary pliers can engage the deformed head and rotate the security fastener for removal.

One arrangement for preventing such tampering is to locate the security fastener within a recess in the panel. The sides of the recess must be spaced sufficiently apart to permit the special drive tool to fit into the recess and engage the head of the fastener, but sufficiently close together to prevent other tools such as pliers from engaging the head of the fastener. Such recesses increase the cost of manufacturing and are not desirable for some installations.

SUMMARY OF THE INVENTION

An object of the invention is to provide a security fastening assembly for a security paneling system which can be mounted to provide improved tamper resistance without the need for a recessed mount.

Another object of the invention is to provide a security fastening assembly that is relatively inexpensive to manufacture and install.

A further object of the invention is to provide a security washer for use with a removable security fastener to tamper-resistant secure a first member to a second member.

Other objects, aspects and advantages of the invention will become apparent to those skilled in the art upon reviewing the following detailed description, the drawings and the appended claims.

The invention provides a security fastening assembly including a removable security fastener and a security washer for security paneling systems including one or more panels secured to a support member. The security fastener includes a shank connected to a slotless head which has a peripheral edge portion and is rotatable for installation and removal with a special driving tool. The special driving tool includes a driver head having an outer periphery with a maximum outside dimension, and a cavity having an internal shape corresponding to the shape of the peripheral edge portion of the security fastener head and adapted to fit over and drivingly engage the head.

The security washer has a body including a central aperture through which the shank of the security fastener extends and a recess concentric with the aperture for receiving the head of the security fastener. The recess includes a bottom wall on which the head of the security fastener rests, a depth at least about as deep as the height of the peripheral edge portion, and a minimum inside dimension approximating but slightly greater than the maximum outside dimension of the tool driver head to permit the cavity of the tool to fit over the head of the security washer and drivingly engage the peripheral edge portion thereof, thereby minimizing access to the head of the security fastener with a tool other than the special driving tool. Preferably, the security washer also includes a smooth, convex outer surface.

The invention also provides a security washer for use with a removable security fastener to tamper resistant secure a first member to a second member.

BRIEF DESCRIPTION OF THE DRAWINGS

FIG. 1 is a perspective view of a security paneling system embodying various of the features of the invention.

FIG. 2 is a cross-sectional view taken generally along line 2—2 in FIG. 1.

FIG. 3 is a cross-sectional view taken generally along line 3—3 in FIG. 1.

FIG. 4 is an enlarged, exploded, perspective view of the parts illustrated in FIG. 3.

FIG. 5 is a side view of a security fastener.

FIG. 6 is a top plan view of the security fastener shown in FIG. 5.

FIG. 7 is a perspective view of a special driving tool for installing and removing the security fastener shown in FIGS. 5 and 6.

FIG. 8 is a partially broken away, perspective view of a security washer of the invention.

FIG. 9 is a top plan view of the security washer shown in FIG. 8.

FIG. 10 is a cross-sectional view taken generally along line 10—10 in FIG. 8.

DESCRIPTION OF A PREFERRED EMBODIMENT

While security fastening assemblies of the invention can be used in other applications requiring tamper resistant paneling systems, it is particularly suitable for use in suspended security ceilings for rooms like prison cells, and will be described in connection with that application.

Illustrated in FIGS. 1-4 is a security paneling system 10 forming a suspended security ceiling in a prison cell. The security paneling system 10 includes a plurality of wall supports 12 mounted on the cell walls 14, a plurality of rectangular panels 16 supported on the wall supports 12, a plurality of hold down plates 18 and a plurality of security fastening assemblies 19, consisting of a removable security fastener 20 and a security washer 22, for mounting the panels 16 on the wall supports 12.

Although the panels 16 can be configured differently, in the embodiment of the invention illustrated in FIGS. 1-4, the panels 16 each include an elongated planar web section 24, which can be solid or perforated, having an inner surface 26 facing the interior of the cell and an outer surface 28, opposed end portions 29, and side rails 30 extending upwardly from and along the length of the opposed sides of the web section 24. The opposite ends of the web section 24 include apertures 31 for receiving the security fasteners 20 as described below. The apertures 31 can be formed as part of the manufacturing process or drilled at the installation site, As best shown in FIG. 2, each of the side rails 30 has a vertically extending side wall 32 and an inturned flange 34 extending laterally inwardly from the top portion of the side wall 32. The panels 16 preferably are brake formed, rolled or otherwise formed from a sheet metal such as steel, and are typically constructed from 16 gauge sheet steel and can be up to 15 feet and even longer when heavier sheet materials are used.

Although different supports can be used, in the illustrated embodiment, the wall supports 12 are mounted on opposed cell walls 14. When the dimensions of a cell are such to require two or more ceiling panels end to end, intermediate supports (not shown) suspended from ceiling joists (not shown) and extending parallel to the opposed pair of wall supports 12 can be used. The wall supports 12 preferably are brake formed, rolled or otherwise formed from a sheet metal such as steel, and include a vertical wall or leg 36 which is mounted against a cell wall 14 by a plurality of bolts 38 anchored in the cell wall 14 or other suitable fastening means, and a lower flange 42 extending laterally inwardly from the lower portion of the vertical leg 36 and including a plurality of apertures 58 for receiving a security fastener 20 as described below. The wall supports 12 typically are approximately 10 feet long and are located on the cell walls 14 so that the lower flanges 42 are at the desired height for the ceiling. A plurality of the ceiling panels 14 are mounted side by side with the side rails 30 of adjacent ceiling panels 14 abutting, and the end portions 29 are supported by a wall support 12 so that the web sections 24 rest on the lower flange 42 as illustrated in FIG. 1.

Referring to FIGS. 1-4, the panels 16 are held against the lower flanges 42 of the wall supports 12 by hold down plates 18 and security fastening assemblies 19 consisting of a security fastener 20 removably connected to the hold down plates 18 and a security washer 22. While other fasteners may be used, in the illustrated embodiment of the invention each security fastener 20 includes a head 46 and a shank 44 which has external threads 48 and extends through an aperture 59 in the lower flange 40 of a wall support 12. The hold down plates 18 include a plurality (e.g., 3) of equally spaced internally threaded apertures 50 for receiving security fastener shanks 44. Preferably, the length of each hold down plate 18 is relatively close to the width of the panels 16. For example, when the panels 16 are 17 inches wide, the hold down plates 18 are approximately 16 inches long. When all of security fastening assemblies 19 for one end of a panel 16 are installed, the hold down plate 18 clamps substantially the entire width of the end of the panel 16 against the lower flange 42 and prevents prying the panel 16 away from the flange 42.

While other suitable arrangements can be used for temporarily holding the hold down plates 18 in place during installation with the hold down plate apertures 50 aligned with the apertures 58 in the ceiling panels 16 and the apertures 59 in the lower flange 42 of the wall support 12, in the specific embodiment illustrated, the hold down plates 18 are attached to the panels 16 with adhesive material 54 such as double sided tape. The adhesive material 54 includes apertures 56 which are aligned with the apertures 50 in the hold down plates 18 and the apertures 58 in the ceiling panels 16, and are alignable with the apertures 59 in the lower flange 42 of a wall support 12.

Referring to FIGS. 5–7, the head 46 of each security fastener 20 has a special shape which is drivingly engageable for installation and removal only with a special driving tool 60. While other head shapes are possible, in the embodiment illustrated in FIGS. 5–7, the head 46 includes a peripheral edge portion 64 having a slightly oblong shape and a height 66 and a slotless, generally smooth, convex outer surface 62. The special driving tool 60 includes a driver head 66 having an outer periphery 68 of a maximum outside dimension 70 and a cavity 72 having an internal shape corresponding to the shape of the peripheral edge portion 64 of the head 46 and adapted to fit over the head 46 and drivingly engage the peripheral edge portion 64 for rotating the security fastener 20 for installation and removal. Because of the slotless, generally smooth, convex outer surface 62 and slightly oblong shape of the peripheral edge portion 64, screw drivers or conventional wrenches (e.g. socket, open end, adjustable, etc.) generally are ineffective for rotating and removing the security fastener 20 when the head 46 is mounted in a recess. However, when the head 46 is fully exposed, the peripheral edge portion 64 is vulnerable to being gripped by pliers and similar tools.

The security washer 22 provided by the invention minimizes access to the head 46 even though the security fastener 20 is not mounted in a recess, thereby permitting the use of relatively inexpensive security fastening assemblies without the need for recessed mounts.

Referring to FIGS. 7–10, each security washer 22 has a body 73 including a circular central aperture 74 through which the shank 44 of the security fastener 20 extends and a recess 76 concentric with the aperture 74 for receiving the head 46 of the security fastener 20. The recess 76 includes a bottom wall 78 on which the head 46 rests. The minimum inside dimension 80 of the recess 76 approximates but is slightly greater than the maximum outside dimension 70 of the tool driver head 66, to permit the driver head 66 to fit in the recess 76 and the cavity 72 to fit over the head 46 and drivingly engage the peripheral edge portion 64 thereof for rotating the security fastener 20 for installation and removal, and to minimize access to the head 46 with tools other than the special driving tool 60. The minimum inside dimension 80 of the recess provides a clearance of about 0.046 inch to about 0.078 inch, preferably about 0.046 inch to about 0.062 inch, from the maximum outside dimension 70 of the tool driver head 66. The depth 82 of the recess 76 is at least about as deep as the height 66 of the peripheral edge portion 64, to minimize access for prying against the head 46 with a tool such as a conventional screwdriver.

While other security fasteners having different head configurations can be used, commercially available Avsafe TM screws having slightly oblong heads described above are particularly suitable. Although the outside surface 84 and peripheral edge portion 86 of the security washer 22 can have different configurations, in the embodiment illustrated, the outer periphery of the body 73 is circular and the outside surface 84 has a smooth, convex shape. This configuration of the security washer 20 is similar to the shape of the head 46 of the security fastener 20, and makes the security washer 22 similarly resistant to tampering. Additionally, shaping the security washer 22 in this manner suggests to an observer that the security washer 22 is tamper resistant and, therefore, discourages tampering.

Also illustrated in FIG. 1 is an embodiment of the invention wherein the security fasteners 20 and security washers 22 removably secure an access panel 88 to a ceiling panel 16 in a tamper resistant manner. A plurality of hold down plates 18 located around the periphery of the access opening clamp the access panel 88 against the web section 24 of the ceiling panel 16 when security fasteners 20 and security washers 22 are installed as described above.

When sound absorption is desired, a conventional sound absorption material 92 (FIG. 2) such as glass fiber pad wrapped in incombustible polypropylene, can be laid over the outer surfaces 28 of the panels 16.

From the above description, it can be seen that security washers of the invention make the heads of security fasteners substantially inaccessible to anything other than a special tool, without the need for a recessed mount. Security paneling systems employing security washers of the invention are less inexpensive to manufacture and install than systems including recessed panel mounts.

From the foregoing description, one skilled in the are can easily ascertain the essential characteristics of the invention and, without departing from the spirit and scope thereof, make various changes and modifications to adapt it to various usages.

I claim:

1. A security fastening assembly for removably securing panels of a security panel system to a support member comprising a security fastener including a shank connected to a slotless head having a peripheral edge portion with a height and a smooth, generally, oblong peripheral shape and being rotatable for installation and removal with a special driving tool, the tool having a driver head including an outer periphery having a maximum outside dimension and a cavity having an internal shape corresponding to the shape of the peripheral edge portion of said security fastener head and being adapted to fit over and drivingly engage said peripheral edge portion; and a security washer having a circular outer periphery, a smooth, generally convex outer surface, a central aperture through which the shank of said security fastener extends, and a recess concentric with said aperture for receiving the head of said security fastener, said recess having a bottom wall on which the head of said security fastener rests, a depth at least about as deep as the height of the peripheral edge portion of said security fastener, and a minimum inside dimension approximating but slightly greater than the maximum outside dimension of the tool driver head to permit the cavity of the tool to fit over the head of said security fastener and drivingly engage the peripheral edge portion thereof, thereby minimizing access to the head said security fastener with a tool other than the special driving tool.

2. A security fastening assembly according to claim 1 wherein said recess is generally circular.

3. A security fastening assembly according to claim 1 wherein the minimum inside dimension of said recess provides a clearance of about 0.046 inch to about 0.078 inch from the maximum outside dimension of the special tool driver head.

4. A security fastening assembly according to claim 1 wherein the minimum inside dimension of said recess provides a clearance of about 0.046 inch to about 0.062 inch from the maximum outside dimension of the special tool driver head.

5. A security washer for use with a removable security fastener to tamper-resistant secure a first member to a second member, the security fastener having a shank connected to a slotless head having a peripheral edge portion with a height and a smooth, generally oblong peripheral shape and being rotatable for installation and removal with a special driving tool, the tool having a driver head including an outer periphery having a maximum outside dimension and a cavity having an internal shape corresponding to the shape of the peripheral edge portion of the security fastener head and being adapted to fit over and drivingly engage the peripheral edge portion, said security washer comprising:

a body having a circular outer periphery, a smooth, generally convex outer surface and a central aperture through which the shank of the security fastener extends; and a recess in said body and concentric with said aperture for receiving the head of the security fastener, said recess having a bottom wall on which the peripheral edge portion the security fastener rests, a depth at least about as deep as the height of the peripheral edge portion, and a minimum inside dimension approximating but slightly greater than the maximum outside dimension of the tool driver head to permit the cavity of the tool to fit over the head of the security fastener and drivingly engage the peripheral edge portion thereof for rotating the security fastener, thereby minimizing access to the head of the security fastener with a tool other than the special driving tool.

6. A security washer according to claim 5 wherein said recess is generally circular.

7. A security washer according to claim 5 wherein the minimum inside dimension of said recess provides a clearance of about 0.046 inch to about 0.078 inch from the maximum outside dimension of the special tool driver head.

8. A security washer according to claim 5 wherein the minimum inside dimension of said recess provides a clearance of about 0.042 inch to about 0.062 inch from the maximum outside dimension of the special tool driver head.

* * * * *